United States Patent [19]

Clark et al.

[11] Patent Number: 4,575,915

[45] Date of Patent: Mar. 18, 1986

[54] METHOD OF FORMING A COMPOSITE CONTAINER

[75] Inventors: Richard E. Clark; Louis D. Tacito, both of Merrimack; Bryan H. Miller, Nashua; Martin H. Beck, Brookline, all of N.H.

[73] Assignee: Continental Packaging Company, Inc., Stamford, Conn.

[21] Appl. No.: 529,810

[22] Filed: Sep. 6, 1983

[51] Int. Cl.[4] .......................... B21D 39/00; B29C 49/24
[52] U.S. Cl. ..................................... 29/509; 29/527.2; 264/512; 427/230
[58] Field of Search ................ 264/512, 513, 515, 516; 29/509, 527.2; 215/1 C; 220/67, 457, 458; 427/230

[56] References Cited

U.S. PATENT DOCUMENTS

| | | | |
|---|---|---|---|
| 2,282,898 | 5/1942 | Snader et al. | 427/230 X |
| 3,004,285 | 10/1961 | Hagen | 264/540 X |
| 3,341,059 | 9/1967 | Schild et al. | 220/67 |
| 3,405,439 | 10/1968 | Uemura | 29/509 |
| 3,690,928 | 9/1972 | Carmien | 427/230 X |
| 3,821,015 | 6/1974 | Feinberg | 427/230 |
| 4,108,937 | 8/1978 | Martineu et al. | 264/529 |
| 4,398,648 | 8/1983 | Cerny et al. | 220/67 |
| 4,478,889 | 10/1984 | Marunashi et al. | 427/230 |

FOREIGN PATENT DOCUMENTS 835412  5/1960  United Kingdom ................ 220/457

*Primary Examiner*—Jan Silbaugh
*Attorney, Agent, or Firm*—Charles E. Brown

[57] ABSTRACT

This relates to the forming of a blow molded polyester container wherein a bottle having a conventional upper neck portion and an intermediate body is provided with a lower portion which includes an annular seaming flange which is integrally connected to the lower end of the body and wherein, with the exception of the seaming flange, the lower portion is removed and the bottle is closed by a separately formed bottom double seamed to the lower end of the body utilizing the annular seaming flange. During the interim between the removal of the bottle lower portion and the application of a separate bottom, the bottle is fully open so as to be readily commercially interiorly coated with a barrier coating. The separately formed bottom may be readily formed of metal and may be so constructed as to provide a large diameter base for supporting the bottle in upstanding position. This abstract forms no part of the specification of this application and is not to be construed as limiting the claims of the application.

5 Claims, 6 Drawing Figures

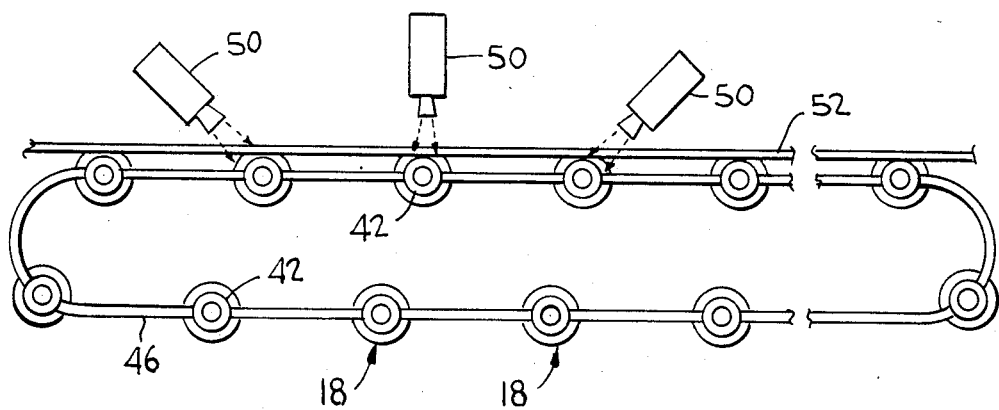
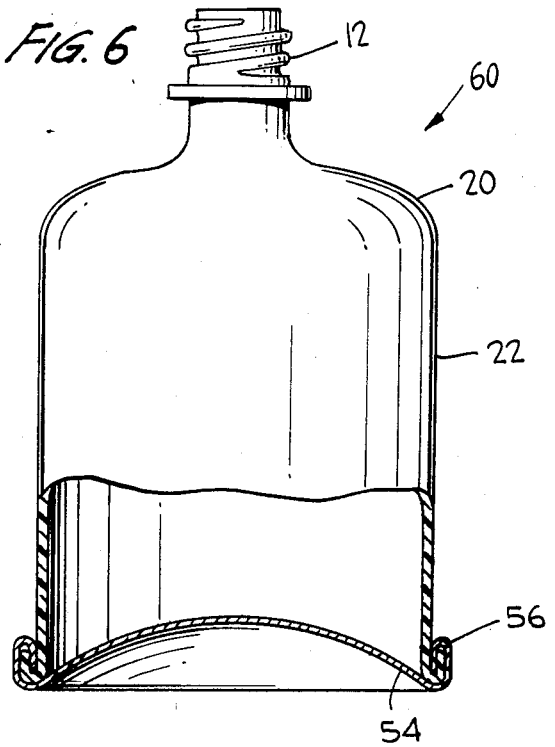

METHOD OF FORMING A COMPOSITE CONTAINER

At the present time large size, i.e. one liter and two liter bottles, are commercially practical when blow molded of a polyester such as PET. On the other hand, when the bottle size is reduced to on the order of one-half liter and less, difficulties are encountered. First, unless a separate cup base is provided, smaller bottles do not have the desired stability. Secondly, there is a limited shelf life for such bottles of all sizes which are blow molded from polyester in that not only does the $CO_2$ gas in the case of carbonated beverages penetrate the bottle, but is also absorbed in the polyester from which the bottle is formed. In addition, there is permeation of $O_2$ into the interior of the bottle. The foregoing problems would also exist when like bottles are formed of other plastic materials such as polypropylene and acrylonitrile based materials.

In accordance with this invention, both of the problems can be solved by eliminating the integrally formed bottom and substituting therefor a separate bottom which is preferably formed of sheet metal, either steel or aluminum.

With respect to the question of $CO_2$ penetration and absorption, it has been found that by applying a suitable barrier coating to the exterior of existing resin bottles, the problem of $CO_2$ permeation may be reduced although not solved. Further, this does not solve the $CO_2$ absorption problem. Bottles may be readily coated with a suitable barrier material after forming to prevent the permeation. However, because of the small diameter of the throat of the neck portion of the bottle, the bottle cannot be readily internally coated and properly dried. The diameter is insufficient for the commercial spray coating of the bottle. In a manner, the throat is also too small for it to be commercially practical to coat the bottles by filling with the coating liquid and then emptying.

In accordance with this invention, when the original bottom of the bottle is cut off, the thus formed bottle may be readily internally coated either by dipping wherein simultaneous internal and external coating occurs, or by spraying wherein separate spray means are provided for the interior and/or exterior. At the same time the wide mouth provides means for large air movement so as to permit the coating to dry properly.

With respect to the closing of the open bottom of the bottle using a separate bottom, it has been found that sufficient biaxial orientation can be obtained in an annular seaming flange integrally formed on the lower end of the blow molded body, and that the separate bottom, particularly when formed of a metal such as aluminum or steel, may be readily double seamed in place in a conventional manner. By separately forming the metal bottom independently of any container body wall, it will be seen that the bottom may be of an appropriate thickness such as to resist high internal pressures without necessitating complex shaping of the bottom.

With the above and other objects in view that will hereinafter appear, the nature of the invention will be more clearly understood by reference to the following detailed description, the appended claims, and the several views illustrated in the accompanying drawings.

IN THE DRAWINGS

FIG. 5 is a schematic top plan view of a mechanism for spray coating the interiors and exteriors of blow molded bottle components.

FIG. 6 is a vertical sectional view taken through a bottle formed in accordance with this invention wherein the bottom thereof is closed by a metal bottom member which is double seamed to the lower end of the bottle body utilizing the annular seaming flange.

Figure 1:
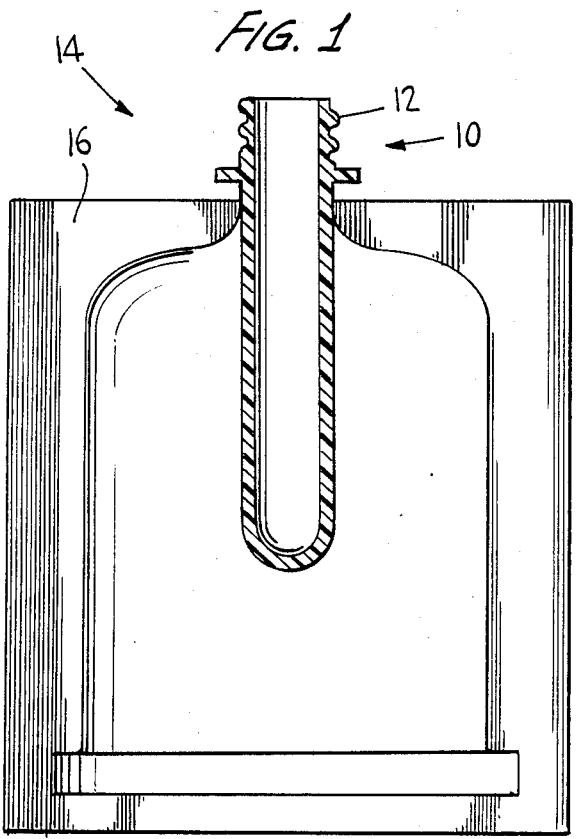
FIG. 1 is a vertical sectional view taken through a preform which is seated in one half of a blow mold.
Figure 2:
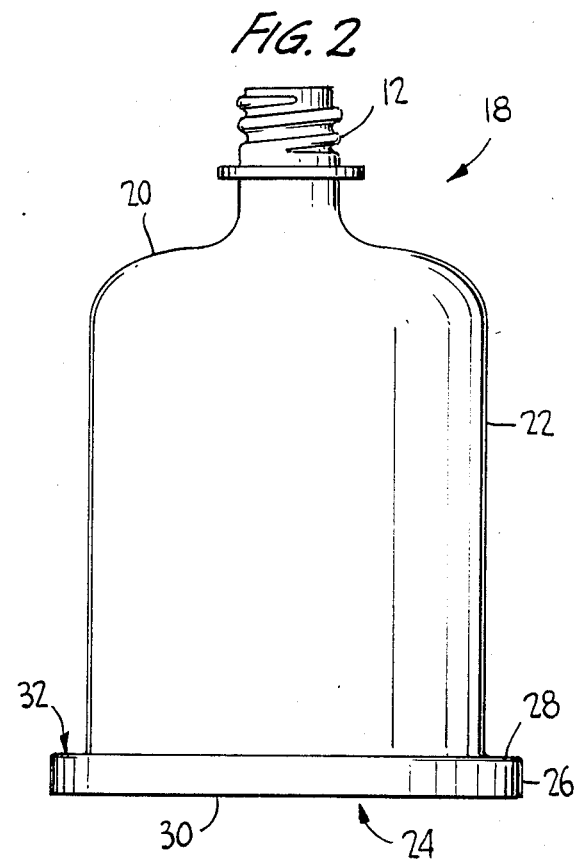
FIG. 2 is a sectional view through a bottle which is blow molded in accordance with this invention.

Referring now to the drawings in detail, it will be seen that there is illustrated in FIG. 1 a conventional injection molded preform 10 which has a conventional upper neck portion 12 adapted to have removably secured thereto a replaceable closure.

The preform 10 is presented to an axially split blow mold 14 of which only one half 16 is shown. The preform 10 is blow molded within the mold 14 to the configuration defined by the mold 14, and at the termination of such blow molding is in the form of an intermediate product 18 including an integral neck finish 12 which is joined by a shoulder 20 to a cylindrical body portion 22. The blow molded article 18 also includes a bottom portion 24 which is generally in the form of a ring 26 having an upper connecting portion 28 in the form of an annular flange which is integral with the lower end of the body 22. The lower portion 26 also includes an integral bottom part 30 which need not be of a thickness to retain high internal pressures.

After the article 18 has been formed, it is suitably cut around the outer periphery of the annular flange 28 as indicated by the arrow 32 so as to remove the lower portion 24, with the exception of the annular flange 28, from the body 22.

At this time it must be appreciated that the preform 10 is formed of a suitable biaxially oriented resin, which may be a polyester such as PET or a polypropylene or acrylonitrile based material, and therefore, in view of the elongation of the preform and the increase in diameter thereof, the container body 22 and the container lower portion 24 have all portions thereof biaxially oriented. This includes the annular flange 28 which becomes a seaming flange.

The removal of the lower portion 24 has a twofold advantage. First of all, the bottom of the thus molded and trimmed container may be made open and ready for the reception of a metal end unit. Thus the interior of the formed bottle 18 is readily available for receiving an internal barrier coating while at the same time, subsequent to the coating operation, a metal end unit may be readily double seamed to the annular flange.

Figure 3:
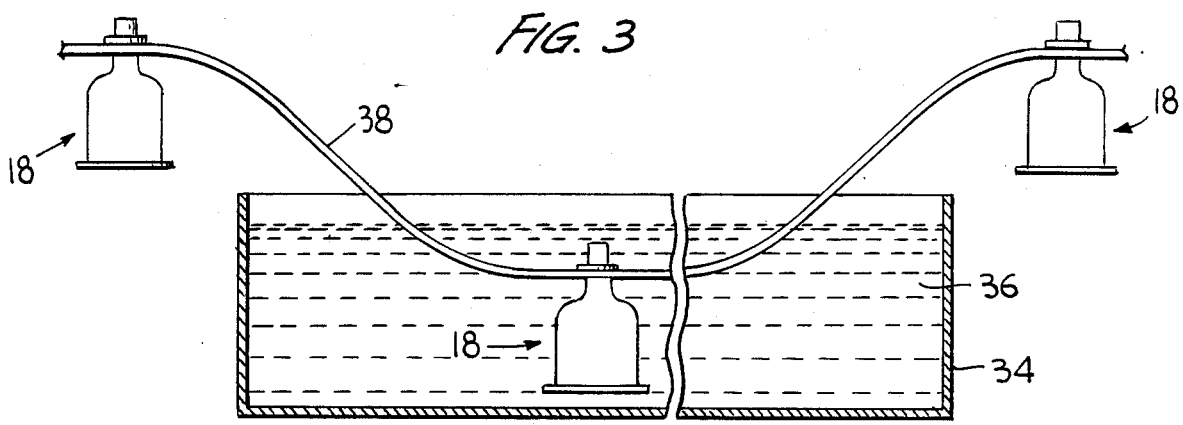
FIG. 3 is a schematic elevational view showing the manner in which the blow molded bottle of FIG. 2, with the bottom portion thereof removed, may be readily simultaneously internally and externally coated with a barrier layer in a simple dipping process.

Referring now to FIG. 3, there is schematically illustrated how the open bottom bottle 18 may be readily simultaneously exteriorly and interiorly coated with a barrier material. There is provided an elongated tank 34 having therein a suitable liquid barrier forming coating material 36, such as EVOH (ethylene vinyl alcohol) and PVDC (polyvinyldene chloride). These barrier coatings may be applied over an adhesive type overcoat. The open bottom bottles 18 are carried by a carrier 38 for movement down into the coating liquid 36 and there out of for draining purposes. It will be seen that since both ends of the open ended bottle 18 are open, the bottles may be fully submerged within the coating liquid 36 without the entrapment of any air, and thus, particularly when it is desired internally and externally to coat with the same material, and thus may be readily interiorly and exteriorly coated in a simple dip coating operation.

Figure 4:
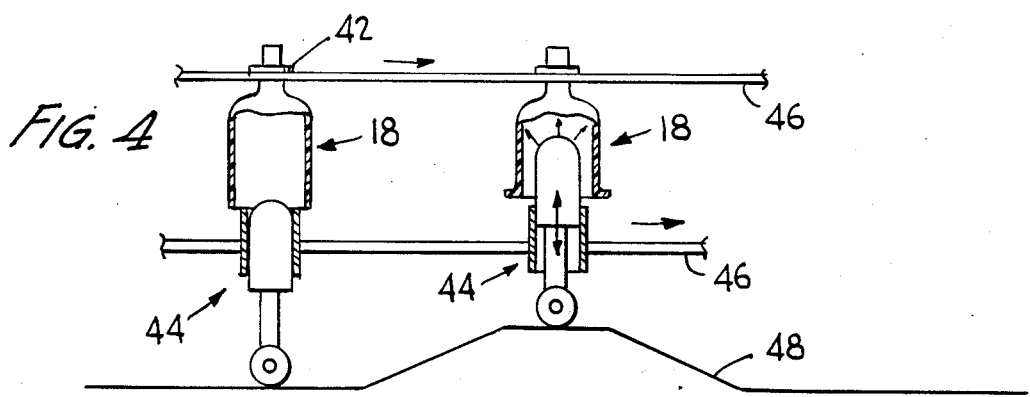
FIG. 4 is a schematic side elevational view.

On the other hand, the open bottom bottles may be suitably interiorly and/or exteriorly coated by means of conventional spray coating heads. As is shown in FIG. 4, the bottles 18 may be carried by a bottom run of an endless conveyor between an infeed location and a discharge location, with the conveyor being generally identified by the numeral 40 and it being understood that the carrier 40 includes a plurality of rotatable bottle retaining heads 42 which are rotatable relative to the conveyor 40.

Disposed beneath the open bottom bottles 18 and at a spacing corresponding substantially to the spacing of such bottles, is a plurality of internal spray coating heads 44 which are carried by a further conveyor chain 46 for movement in a horizontal plane as shown in FIG. 5. Each of the spray coating heads 44 is mounted for movement into the interior of an associated bottle 18 by way of a positioning cam 48 which moves each coating head 44 into and out of the respective bottle 18 internally to coat the same. As shown in FIG. 5, the coating heads 44 are carried by the conveyor 46 in a generally horizontal plane. The open bottom bottles 18 may also be exteriorly coated either in the same mechanism or a separate mechanism by means of a plurality of fixed coaters 50 which are positioned and operate in timed relation so as fully to externally coat each open bottom bottle passing the same. In order that the exterior of each bottle may be fully coated, the carriers 42 are mounted for rotation independently of the conveyor 40 and engage a stationary rub rail 52 which effects the automatic rotation of the carriers 42 as well as the open bottom bottles carried thereby.

The open bottom bottles 18, suitably coated, are then closed by the application of a separate bottom 54 which is secured to the bottle body 22 by means of a conventional double seam 56 which incorporates the annular seaming flange 28. The separate bottom 54 is preferably formed of metal and may be upwardly bowed to resist internal pressures.

The resultant closed bottom 60 is ready to receive a product, such as a carbonated beverage, and may be closed by means of any suitable closure (not shown) preferably one which is unthreadable from the bottle and thus replaceable to reseal the bottle.

It is to be particularly noted that in the simply illustrated bottom construction 54 and the double seam 56 forms the lowest part of the bottle and provides for a large diameter seating base.

While the ability to commercially internally coat the bottle through its temporarily open bottom is of primary interest, it is to be noted that by replacing the customary resin bottom with a metal bottom absorption of permeating materials, such as $CO_2$ is reduced due to less material which will absorb, and permeation is reduced due to the reduction in surface area. Further, the metal bottom results in less creep which yields a lower $CO_2$ loss. Finally, the coatings and the metal bottom greatly reduce $O_2$ permeation from the atmosphere into the interior of the bottle.

It is to be noted that the invention is applicable to larger size containers than even 2 liter bottles with the same benefits. In fact, with larger bottles there is a cost reduction involved because the PET material saved (cut off and reused) costs more than the metal end and the cost of applying the seam.

The invention may also be applicable in the formation of aerosol containers with the usual dome being crimped to the top of the container instead of having a closure threaded therein in the normal manner. The same benefits will apply to aerosol containers, i.e. less creep, permeation, absorption, as well as stability, etc.

Although only a preferred method of forming the container has been specifically illustrated and described herein, it is to be understood that minor variations may be made in both the container configuration and the method of forming the same without departing from the spirit and scope of the invention as defined by the appended claims.

What is claimed as new is:

1. A method of forming a blow molded container of a biaxially orientable resin having a stable base and having an internal barrier coating; said method comprising the steps of blow molding a bottle-like container having an upper end portion including a neck finish for receiving a closure, an intermediate body, and a lower portion including an annular flange at a lower end of said body; severing all of said lower portion, with the exception of said annular flange, from said body to define an open lower end; applying an internal barrier coating to the thus formed container through the body open lower end in a dip coating operation by supporting the container by its neck finish and moving the container down into and then out of a bath of coating liquid; and then applying a separate bottom to said body utilizing said annular flange as a seaming flange to close the body open lower end.

2. A method according to claim 1 wherein during said blow molding said body and said annular flange the material of said body and said annular flange becomes biaxially oriented.

3. A method according to claim 2 wherein said separate bottom is applied in a double seaming operation and wherein said biaxial orientation of said annular flange permits said double seaming operation.

4. A method according to claim 1 wherein an external barrier coating is simultaneously applied in said dip coating operation.

5. A method according to claim 1 wherein said barrier coating is applied over an adhesive type overcoat.

* * * * *